United States Patent
Momose

Patent Number: 6,068,187
Date of Patent: May 30, 2000

[54] INFORMATION DETECTION APPARATUS AND INFORMATION DETECTION METHOD FOR RECORDING MEDIA

[75] Inventor: Tsutomu Momose, Okaya, Japan

[73] Assignee: Seiko Epson Corporation, Tokyo, Japan

[21] Appl. No.: 09/099,073

[22] Filed: Jun. 17, 1998

Related U.S. Application Data

[63] Continuation-in-part of application No. 08/863,446, May 22, 1997, Pat. No. 5,965,862, which is a continuation-in-part of application No. 08/544,528, Oct. 18, 1995, Pat. No. 5,789,727.

[30] Foreign Application Priority Data

| Oct. 18, 1994 | [JP] | Japan | 6-252507 |
| Dec. 27, 1994 | [JP] | Japan | 6-326487 |
| Jun. 30, 1995 | [JP] | Japan | 7-166555 |
| Aug. 4, 1995 | [JP] | Japan | 7-199822 |
| May 22, 1996 | [JP] | Japan | 8-127537 |
| Jun. 18, 1997 | [JP] | Japan | 9-161697 |

[51] Int. Cl.⁷ .................................................. G06K 7/08
[52] U.S. Cl. .................. 235/449; 235/439; 235/475; 235/486; 235/493; 271/902; 400/73
[58] Field of Search .................... 235/449, 439, 235/475, 486, 493; 902/27; 271/902; 400/73

[56] References Cited

U.S. PATENT DOCUMENTS

| 3,296,605 | 1/1967 | Raddin et al. | 235/449 X |
| 3,815,497 | 6/1974 | Wallace | 902/18 X |
| 3,851,115 | 11/1974 | Zacaroli | 360/126 X |
| 4,097,910 | 6/1978 | Lafevers et al. | 360/126 |
| 4,196,846 | 4/1980 | Kao et al. | 235/475 |
| 4,239,151 | 12/1980 | Enser et al. | 235/449 X |
| 4,287,409 | 9/1981 | Auchinleck | 235/475 |
| 4,315,246 | 2/1982 | Milford | 235/449 X |
| 4,384,197 | 5/1983 | Kawakami | 235/449 X |
| 4,613,747 | 9/1986 | McCarthy | 235/480 |
| 4,617,457 | 10/1986 | Granzow et al. | 902/18 X |
| 4,634,263 | 1/1987 | Miwa | 271/270 X |
| 4,684,794 | 8/1987 | Holland-Letz | 235/449 |
| 4,731,524 | 3/1988 | Brooks | 235/449 X |
| 4,786,789 | 11/1988 | Gaucher | 235/432 |
| 4,847,475 | 7/1989 | Watabe et al. | 235/488 X |
| 4,871,905 | 10/1989 | Mita et al. | 235/449 X |

(List continued on next page.)

FOREIGN PATENT DOCUMENTS

| 0 179 502 | 4/1986 | European Pat. Off. |
| 0 191 678 | 8/1986 | European Pat. Off. |
| 0 223 395 | 5/1987 | European Pat. Off. |
| 34 45 734 | 7/1985 | Germany |
| 37 04 059 | 8/1988 | Germany |
| 63-87668 | 6/1988 | Japan |
| 1-116968 | 8/1989 | Japan |
| 2-267773 | 11/1990 | Japan |
| 2 180 679 | 4/1987 | United Kingdom |
| WO 94/10649 | 5/1994 | WIPO |

*Primary Examiner*—Michael G Lee
*Attorney, Agent, or Firm*—Eric B. Janofsky

[57] ABSTRACT

Provide a composite processing device and its control method capable of reliably bringing the recording medium in contact with the information detector using a simple configuration and separately configuring the insertion member and exit member for the recording medium. MICR head 33 which comes in contact with check paper P and detects the information recorded thereon, and presser roller 34 for pressing check paper P against MICR head 33 are provided. Presser roller 34 can release the pressure against MICR head 33. Insertion rollers 23, 24, slip center rollers 21, 22 and ejection rollers 19, 20 are provided for moving check paper P back and forth. Slip center rollers 21, 22 are disposed near the entry side of reader unit 32. After check paper P is inserted and form fed by transporting in the direction of arrow F, presser roller 34 presses check paper P against MICR head 33 and transports it in the direction of arrow B to perform reading. Upon completion of reading, check paper P is transported in the direction of arrow F to perform printing.

18 Claims, 13 Drawing Sheets

U.S. PATENT DOCUMENTS

| | | | |
|---|---|---|---|
| 4,874,161 | 10/1989 | Murasaki et al. | 271/265 |
| 5,014,324 | 5/1991 | Mazumder | 235/449 X |
| 5,045,674 | 9/1991 | Mita et al. | 235/439 |
| 5,053,607 | 10/1991 | Carlson et al. | 235/379 |
| 5,146,070 | 9/1992 | Toma | 235/475 |
| 5,157,246 | 10/1992 | Nakanishi | 235/449 X |
| 5,218,173 | 6/1993 | Garwin et al. | 178/18 |
| 5,362,951 | 11/1994 | Kanazawa et al. | 235/449 |
| 5,393,966 | 2/1995 | Gatto et al. | 235/449 X |
| 5,430,280 | 7/1995 | Kikuchi | 235/449 |
| 5,438,186 | 8/1995 | Nair et al. | 235/449 |
| 5,466,914 | 11/1995 | Kitahara | 235/475 X |
| 5,479,532 | 12/1995 | Abel et al. | 235/449 X |
| 5,789,727 | 8/1998 | Teradaira et al. | 235/449 |
| 5,965,862 | 10/1999 | Momose | 235/449 |

INFORMATION DETECTION APPARATUS AND INFORMATION DETECTION METHOD FOR RECORDING MEDIA

CROSS REFERENCE TO RELATED APPLICATIONS

This application is a continuation-in-part of application Ser. No. 08/863,446 filed on May 22, 1997 now U.S. Pat. No. 5,965,862, which is a continuation-in-part of application Ser. No. 08/544,528 filed on Oct. 18, 1995 now U.S. Pat. No. 5,789,727. The contents of application Ser. Nos. 08/863,446 and 08/544,528 are incorporated herein in their entirety by reference.

BACKGROUND OF THE INVENTION

1. Field of the Invention

This invention relates to a composite processing device and to its control method for processing printed media, and more particularly it relates to a composite processing device and its control method for reading the magnetic ink characters on personal checks, stocks, bonds and other printed media and for performing printing processing on those printed media.

2. Description of the Related Art

Checks including personal checks (referred to as checks below) are widely used for commercial dealings and to purchase items in stores. In addition to the amount and signature, required information on the front of a check such as the bank number and the account number and other standard items such as the check number are noted in prescribed locations as magnetic ink character recognition (MICR) characters.

Since the presence or absence of magnetic ink can be detected by a magnetic head, magnetic ink character readers (MICR) have been developed that extract the information by reading MICR characters, and operators that receive checks or other negotiable instruments in a store, for example, use these MICR devices to confirm the validity of these checks, etc., by detecting the magnetic ink and reading the information, after which they use a printing device to print their authentication or the name of the receiving store on the back of the check as an endorsement.

In order to simplify this processing, a composite processing device capable of sequentially processing reading of the MICR characters and printing on the back of checks by employing a magnetic head and printer head disposed on the same transport path has been developed.

FIG. 13 shows the principal components of a composite processing device described and claimed in parent application 08/544,528. As shown in FIG. 13, composite processing device 102 which processes checks, etc. as the printing medium is equipped with print head 105 and magnetic head 106. In this composite processing device 102, insertion opening 107, in which checks, etc., are inserted, is disposed in opening 104 at the front of the device and is configured such that checks, etc., are inserted horizontally via insertion opening 107.

Paper feed roller 108 is disposed between insertion opening 107 and paper feed path 110, and when the front edge of the check inserted via insertion opening 107 reaches the position underneath paper feed roller 108, presser roller 109 moves up and presses the check against paper feed roller 108. When the drive mechanism, not shown in the figure, operates in this state, paper feed 108 rotates such that it moves the check into paper feed path 110.

Magnetic head 106 is disposed at the back of paper feed path 110, and paper feed roller 112, configured such that it is turned in synchronization with said paper feed roller 108 by belt 111, is disposed at a position opposite magnetic head 106 with defining paper feed path 110 between them. When the front edge of the check being transported reaches a position above magnetic head 106, paper feed roller 112 moves such that it comes in contact with the check and transports the check further while pressing the check against magnetic head 106. Magnetic head 106 thereby detects the magnetic ink while in stable contact with the check, thus facilitating accurate reading of the information printed in MICR characters.

Paper feed path 110 is formed such that it gradually curves up with print head 105 disposed at its upper end. Paper feed roller 113, which turns in synchronization with transport rollers 109, 112, is disposed between print head 105 and magnetic head 106. After a check is gradually transported upward along paper feed path 110 by transport rollers 109, 112 and is read by magnetic head 106, it is transported further upward by transport roller 113. After the entire check is advanced to a vertical position, prescribed information is printed thereon by print head 105. The check is then ejected from opening 114 of composite processing device 102, thus completing processing of the check.

Composite processing device 102 processes checks without the need for a separate reader device and printer device, thereby processing checks efficiently and reducing space requirements.

Sometimes the checks, etc., on which the MICR characters are printed have wrinkles, curls or folds which inhibit accurate reading of the MICR characters. During transportation, tension is not applied to stretch the checks by paper feed rollers 108, 112, 113, whose rotations are synchronized. Therefore, in order to bring checks in close contact with the magnetic head, the pressure of paper feed roller 112 on the checks is set high. As a result, it is necessary to construct the bearings of paper feed roller 112 and the detection surface of magnetic head 106 with sufficient durability in the earlier composite processing device 102, thus increasing their size and cost.

OBJECTS OF THE INVENTION

Therefore, an object of the present invention is to solve the problems presented by earlier devices, and to provide a composite processing device and control method wherein the recording medium can be brought into stable contact with the information detector while being transferred and read using a simple configuration and sequence.

SUMMARY OF THE INVENTION

In order to achieve the above and other objects, a composite processing device of the present invention is equipped with a reader unit comprising an information detector that detects information recorded on the recording medium by coming in contact with the recording medium, a presser that presses the recording medium against the information detector, and a presser shifter that supports the presser and is capable of moving the presser to the presser position where it presses against the recording medium and to the release position where it does not press against the recording medium, transport mechanism has a main transporter disposed near the recording medium insertion side of the presser location of the reader unit in the transport path, which guides the recording medium between the information detector and the presser. The transport mechanism also moves the recording medium back and forth. A printer is disposed on the recording medium exit side of the main transporter. The printer prints information on the recording medium based on detection results obtained by the information detector.

In the composite processing device of the present invention, form feeding of the recording medium is first performed by transporting the recording medium along the transport path in the exit direction by the main transporter without pressure of the presser against the information detector (i.e. the released position). Then, the presser presses the recording medium against the information detector to detect the information recorded on the recording medium while the main transport transports the recording medium in the direction opposite from the exit direction. Subsequently, pressure against the information detector is released and the printer prints prescribed information on the recording medium while it is being transported along the transport path in the exit direction.

The recording medium is transported in the opposite direction from the exit direction when detecting information. Therefore, MICR characters, for example, can be detected from the trailing edge, thus eliminating the need to perform inverted processing of the detection signal and making it possible to perform highly accurate reading of the characters.

Further, when the recording medium is pressed against the information detector it is pulled by the main transport disposed on the insertion side of the presser location of the reader unit; that is, upstream in the transport direction of the recording medium. Therefore information can be detected from a recording medium with wrinkles, etc., since the recording medium is straightened by applied tension. As a result, a strong force is not required for pressing the recording medium, as in prior art devices. In the present invention, with the main transport disposed near the presser location of the recording medium, only a small force is required.

In addition, pressure on the information detector is released during printing on the recording medium, thereby preventing damage to the information detector. Further, since the recording medium is transported in the exit direction along the transport path, the device can be easily configured such that the insertion member and transport member are separate.

An insertion transporter, which transports the recording medium together with the main transporter, is disposed at the recording medium insertion opening, and an exit transporter, which transports the recording medium together with the main transporter, is disposed at the recording medium exit opening.

Form feeding of the recording medium is performed by transporting the recording medium along the transport path in the exit direction by the main transporter and the insertion transporter without pressure against the information detector, i.e. with the presser in a released state. Then the presser presses the recording medium against the information detector, which detects the information recorded on said recording medium while the main transporter transports the recording medium in the direction opposite from the exit direction. Pressure against the information detector means is then released and the main transporter and the insertion transporter transport the recording medium in the exit direction along the transport path thereby form feeding the recording medium. Prescribed printing on the recording medium is then performed while the main transporter and the exit transporter transport the recording medium along the transport path in the exit direction. The two transport mechanisms (main and export) provide reliable recording medium transportation at a time other than when information recorded on the recording medium is being detected.

A recording medium guide mechanism capable of moving back and forth along the transport path is disposed between the printing location and the retracted location from said printing location between the main transporter and the exit transporter. When the recording medium is guided by the exit transporter, the recording medium is guided by shifting the guide mechanism from the retracted position to the printing position along the transport path, whereby even a recording medium with wrinkles, etc., is reliably guided by the exit transporter and ejected.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The preferred embodiments of the composite processing device and its control method of the present invention are explained below in detail by referring to FIG. 1 to FIG. 12.

Figure 1:
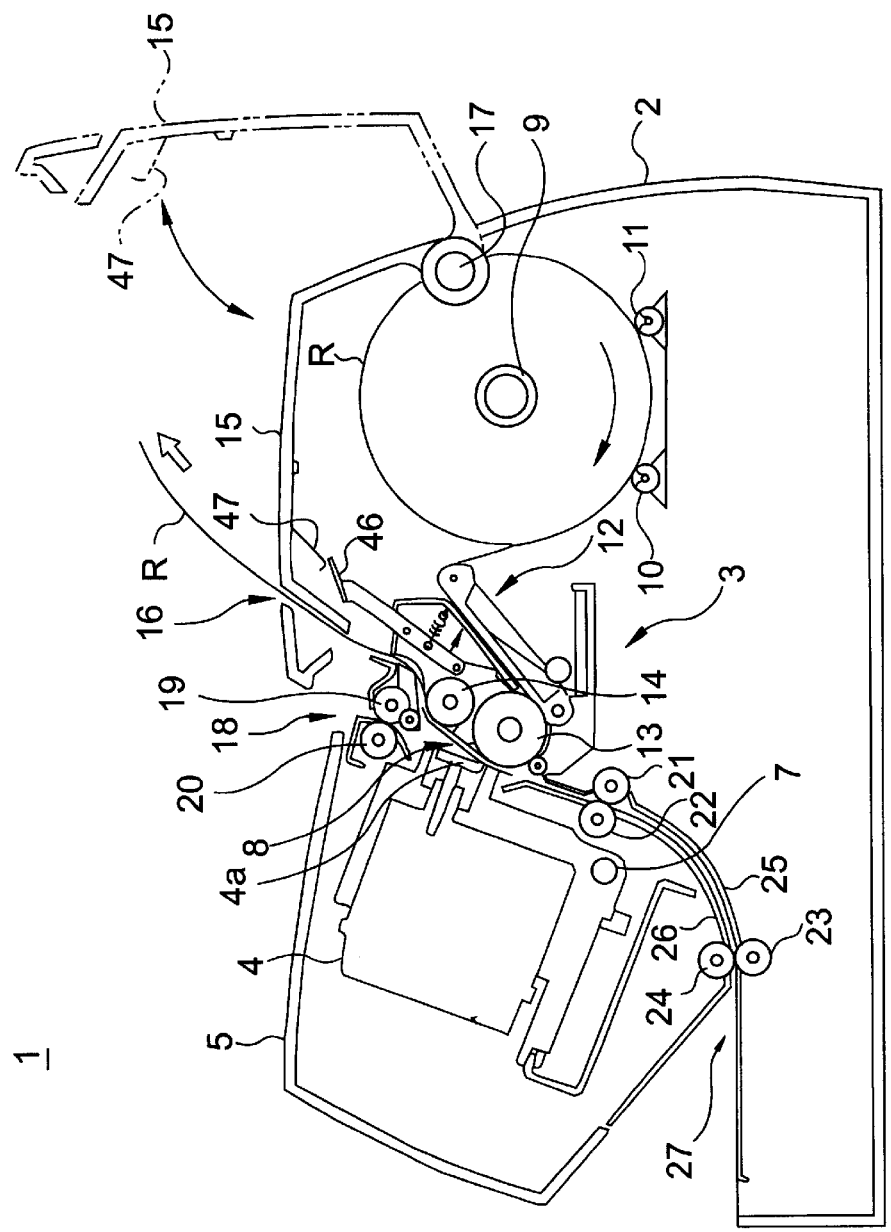
FIG. 1 is a diagram showing the internal configuration of the printer as a first embodiment of the composite processing device of the present invention.
Figure 2:
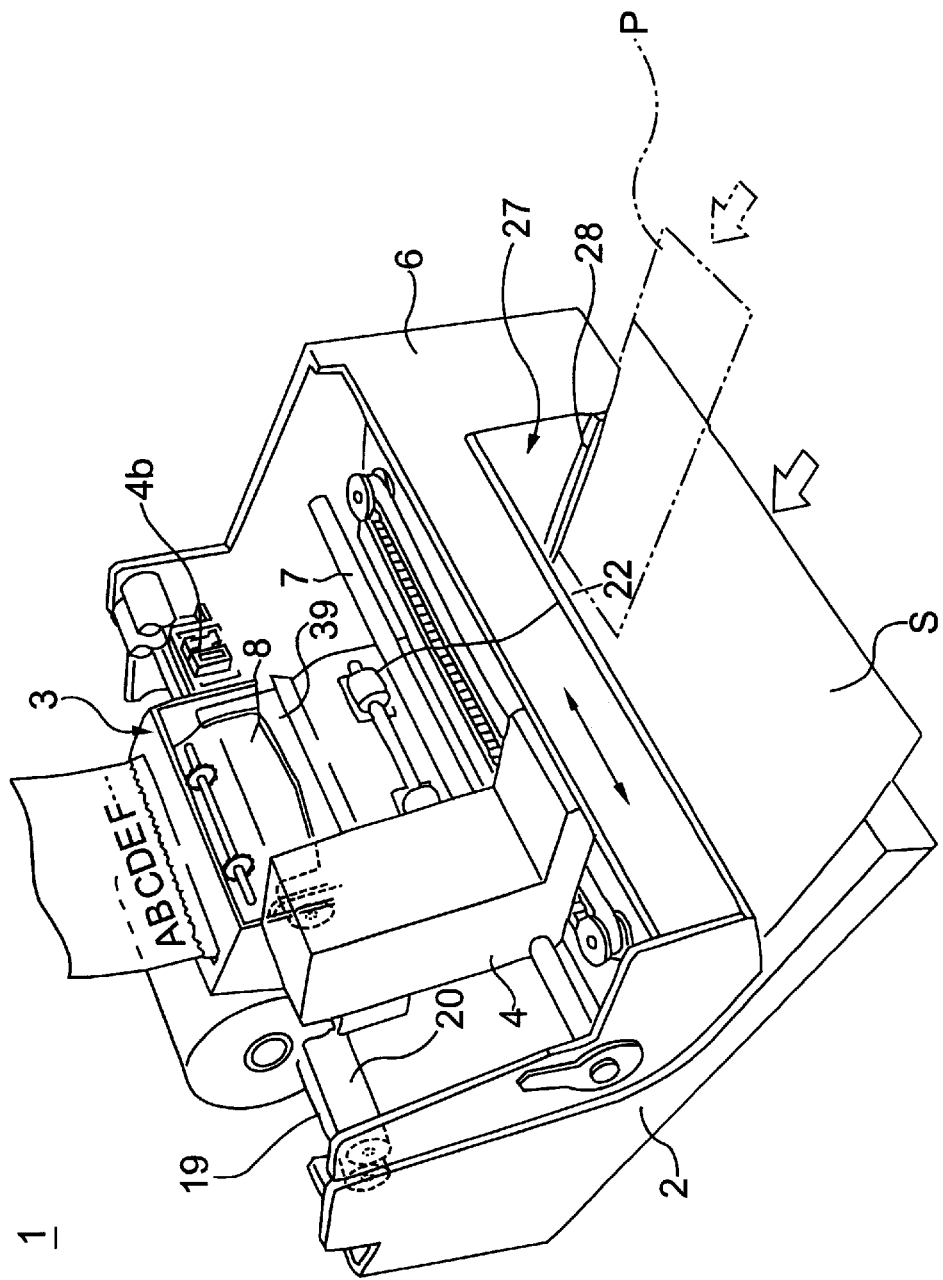
FIG. 2 is a perspective view from the front of the inside of the printer of the first embodiment.

FIG. 1 and FIG. 2 show an overall structure of printer 1 as an embodiment of the composite processing device of the present invention, where FIG. 1 is a diagram showing the internal configuration and FIG. 2 is a perspective view showing the inside of printer 1 from the front.

As shown in FIG. 1, roll paper R is disposed at the back of the inside of main unit cover 2 (made of resin, etc.), and paper transport member 3 for transporting roll paper R is disposed in front thereof.

Printer member 4 employing an ink jet system for printing on roll paper R, etc., is disposed on the front side of and adjacent to paper transport member 3, and printer member 4 is covered by main unit front cover 5 shown in FIG. 1. Cover 5 is also made from resin or other materials.

Roll paper R, paper transport member 3 and printer member 4 are each attached to the main frame, which is made from metal or other rigid materials.

Printer member 4 in this embodiment utilizes a conventional ink jet method of printing, and as shown in FIG. 2, printer member 4 is configured for free movement between both sides of main frame 6 along guide shaft 7, which is attached to main frame 6. This configuration allows the printer to print in both the paper feed and paper width directions, which are perpendicular to each other. Also, as shown in FIG. 1, the printer member 4 is disposed such that print head 4a opposes platen member 8 disposed in paper transport member 3.

Roll paper R is supported such that it can turn freely on the pair of support rollers 10, 11 each disposed parallel to roll core member 9 and is configured such that the leading end of the roll paper is pulled upward from the bottom of the roll paper compartment of the main frame.

The transport path of roll paper R is formed in paper transport member 3. That is, paper transport member 3 is configured such that paper guide member 12 and transport roller 13 reverse the feed direction of roll paper R and, after printing, transport roller 14 ejects roll paper R from exit opening 16 disposed in main unit upper cover 15.

As shown in FIG. 1, main unit upper cover 15 is attached such that it can be rotated freely around support shaft 17, and as described below, it is configured such that platen member 8 moves further from print head 4a as main unit upper cover 15 is rotated.

Slip paper S or check paper (recording medium) P (FIG. 1) are ejected through exit opening 18 (FIG. 2) formed in the middle on the top of the main frame by main unit upper cover 15 and main unit front cover 5. A pair of ejection rollers 19, 20 operate as the exit transporter positioned near exit opening 18. Further, a pair of slip center rollers 21, 22 operate as the main transporter positioned between paper transport member 3 and printer member 4. A pair of insertion rollers 23, 24 operate as the insertion transporter positioned below printer member 4.

Also, opposing guide members 25, 26 extend from the front of the device past insertion rollers 23, 24 and slip center rollers 21, 22 and toward ejection rollers 19, 20. They form insertion opening 27 and also the transport path for slip paper S or check paper P (shown in FIG. 2).

As shown in FIG. 2, slip paper S or check paper P is inserted with one side edge sliding along reference member 28 disposed on the right inner edge of guide member 26. Thus the slip paper S or check paper P is positioned in a direction perpendicular to the insertion direction.

Figure 3:
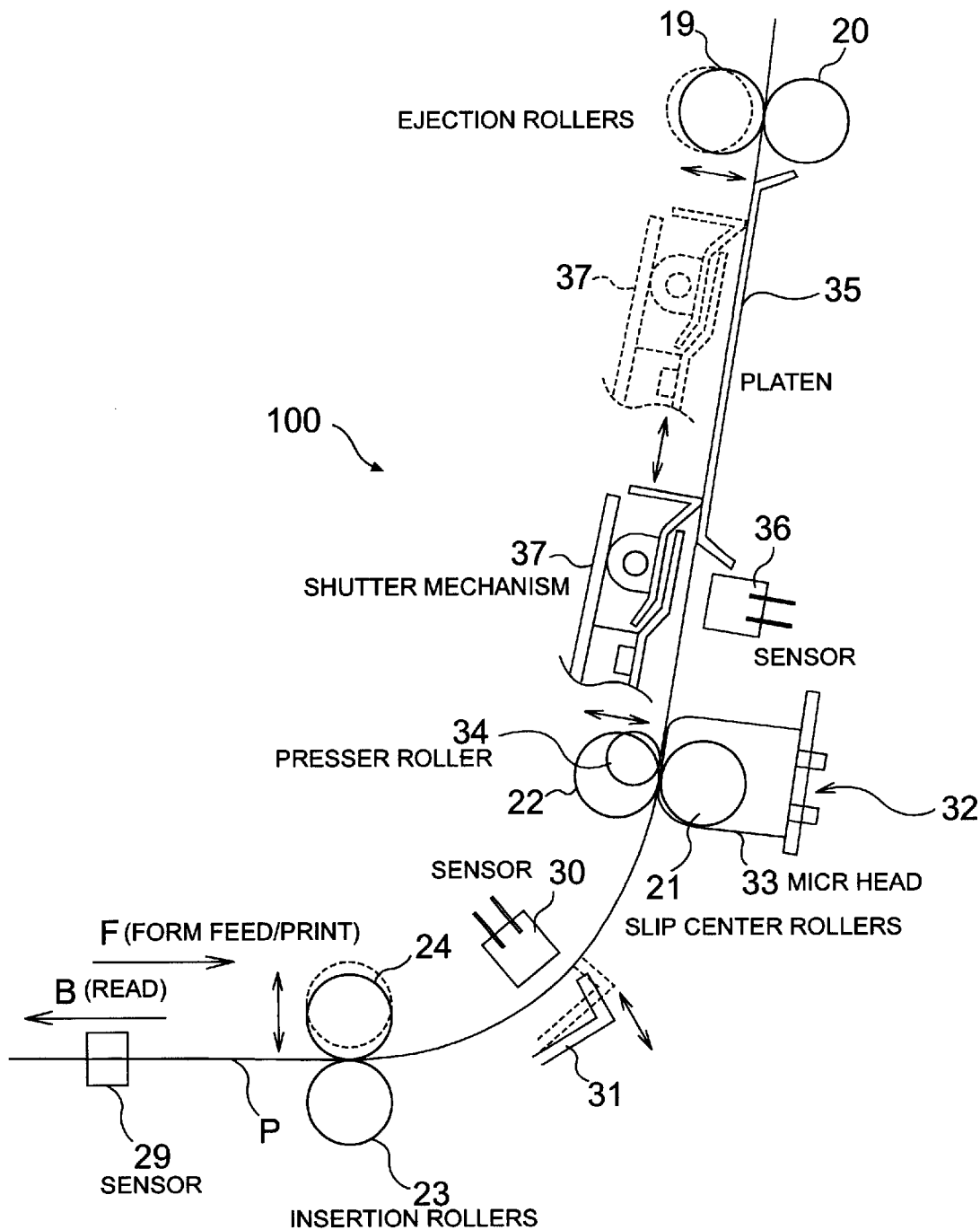
FIG. 3 is a diagram showing the transport mechanism of the slip paper or check paper in the first embodiment.

FIG. 3 shows transport mechanism 100 for slip paper S or check paper P in this embodiment. As shown in FIG. 3, slip paper S or check paper P is transported in transport mechanism 100 in the direction of arrow F (forward) or the direction of arrow B (reverse) by insertion rollers 23, 24, slip center rollers 21, 22 and ejection rollers 19, 20. Ejection roller 20, slip center roller 22 and insertion roller 24 are rotated in synchronism by a drive mechanism (not shown in the figure). Any conventional motor, such as a DC motor or stepping motor, combined with any conventional transmission mechanism, such as a gear train or belt with pulley, are suitable as the drive mechanism.

Insertion rollers 23, 24 are configured such that roller 24 can freely contact and separate from roller 23, and ejection rollers 19, 20 are configured such that roller 19 can freely contact and separate from roller 20. Paper detector (sensor) 29 that detects the presence or absence of slip paper S or check paper P and its trailing edge is positioned downstream in the direction of arrow B of insertion rollers 23, 24. A reflector type sensor, such as a photo-reflector, or interrupter type sensor, such as a photo-interrupter, for example, is utilized as paper detector 29. Leading edge detector (sensor) 30 that detects the presence or absence of slip paper S or check paper P and its leading edge is positioned between insertion rollers 23, 24 and slip center rollers 21, 22. A reflector type sensor, for example, is used as leading edge detector 30.

Form stopper 31 is positioned between insertion rollers 23, 24 and slip center rollers 21, 22. The transport path is formed between form stopper 31 and opposing leading edge detector 30. Form stopper 31 is configured such that it temporarily stops slip paper S or check paper P (which has been inserted) in a prescribed position. Form stopper 31 later retracts from the transport path in a time sequence described hereinbelow.

Reader unit 32 for reading MICR characters recorded on check paper P is positioned adjacent slip center rollers 21, 22. Reader unit 32 includes MICR head 33 functioning as an information detector and presser roller 34 as a presser. It is configured such that check paper P is brought in contact with MICR head 33 by presser roller 34 pressing against this MICR head 33. As an alternative to a presser roller, a presser pad having a slippery surface coated with a conventional lubricating material is also contemplated. In the case of a presser pad, periodic noise caused by a magnetized foreign matter stuck to the presser roller is eliminated since the presser pad does not rotate and the foreign matter is easily removed by the paper passing the surface of the pad.

Further, paper detector (sensor) 36 for detecting the presence or absence of slip paper S or check paper P and its leading edge is positioned next to platen 35 (opposite printer head 4a, FIG. 1). A reflector type sensor is used as paper detector 36.

In addition, shutter mechanism 37 is positioned near platen 35 to guide slip paper S or check paper P so that the paper stays in the transport path between slip center roller 22 and ejection roller 20. Shutter mechanism 37 is configured such that it moves up and down parallel to platen 35 in accordance with the paper movement.

Figures 4A, 4B:
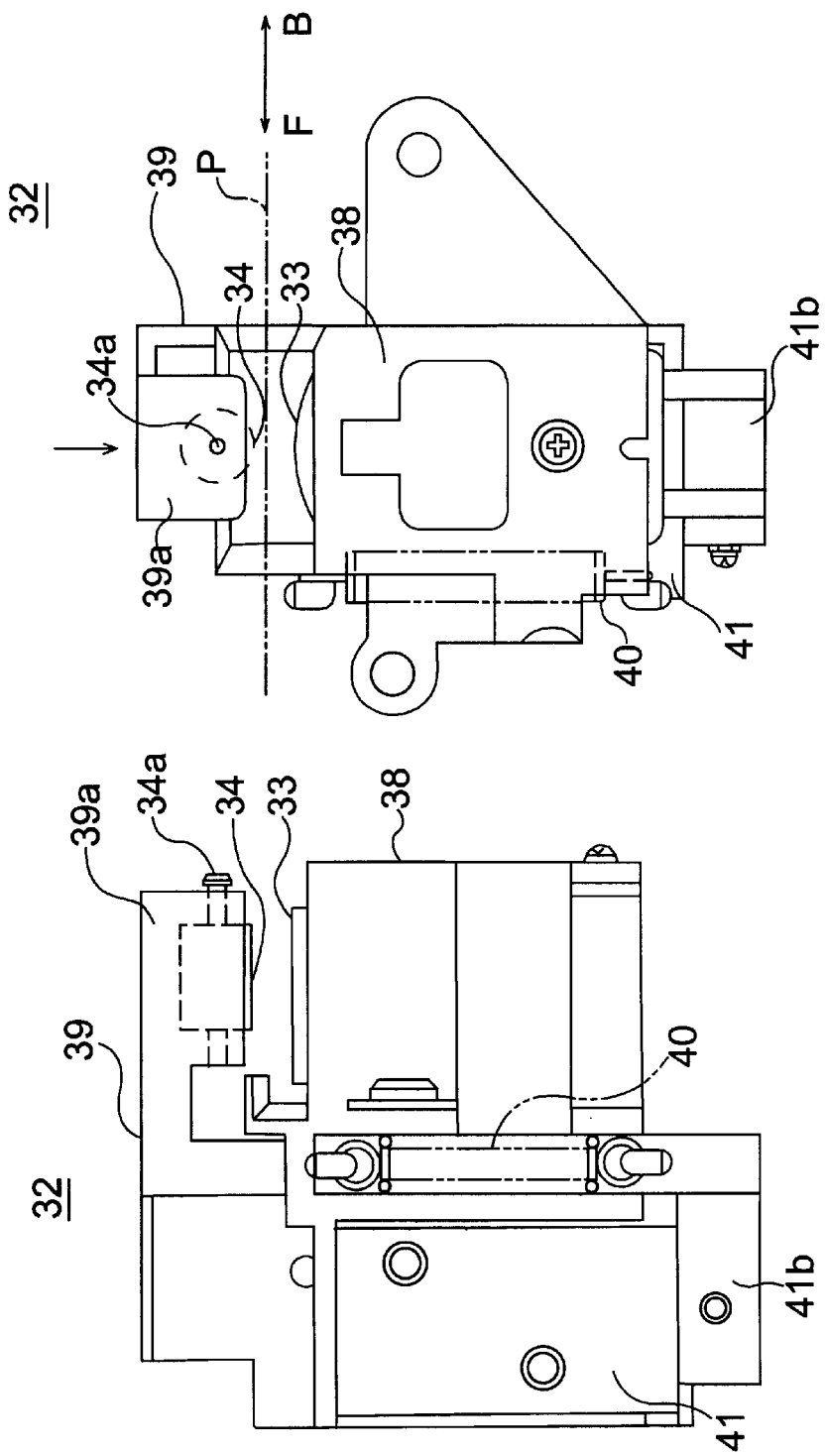
FIG. 4A is a front view of the reader unit in an open state in the first embodiment.
FIG. 4B is a side view of the reader unit in an open state in the first embodiment.
Figures 5A, 5B:
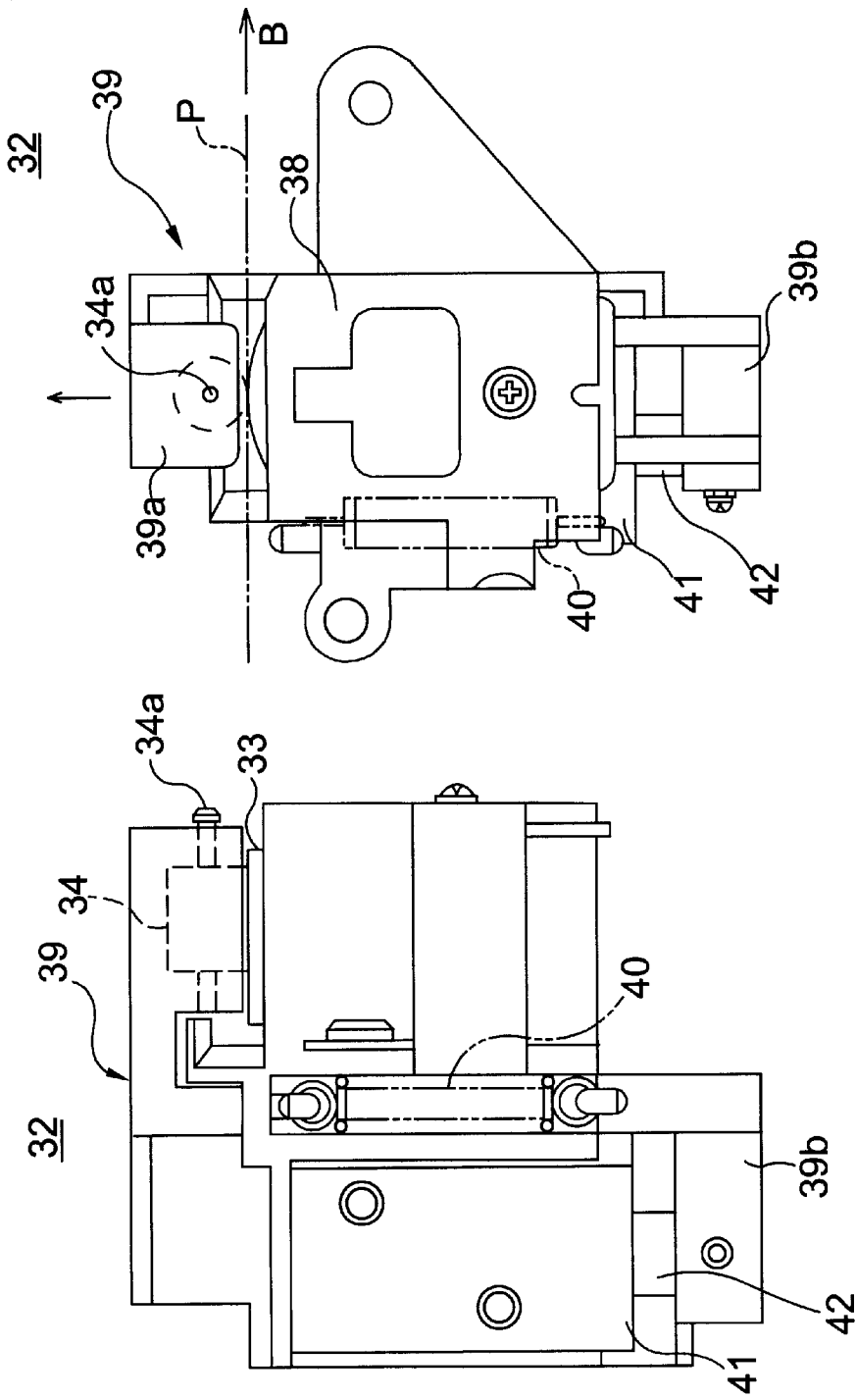
FIG. 5A is a front view of the reader unit in a closed state in the first embodiment.
FIG. 5B is a side view of the reader unit in a closed state in the first embodiment.

FIGS. 4A, 4B and 5A and 5B show reader unit 32, where FIG. 4A is a front view of reader unit 32 in an open state, FIG. B is a side view of reader unit 32 in an open state, FIG. 5A is a front view of reader unit 32 in a closed state, and FIG. 5B is a side view of reader unit 32 in a closed state.

Reader unit 32 has support member 38 and movable member 39, which functions as a presser shifter. Movable member 39 is slidably attached to support member 38 via a lubricating material provided on either one or both of movable member 39 and support member 38. MICR head 33 is supported by support member 38, and presser roller 34 is supported by arm 39a of roughly L-shaped movable member 39 with support shaft 34a at its center such that it can be rotated freely. Also, as shown in FIG. 4B, MICR head 33 and presser roller 34 oppose each other and are configured such that check paper P is inserted between them while they are in the open state.

Coil spring 40 is attached to support member 38 and movable member 39 and causes presser roller 34 and MICR head 33 to come in contact with each other when the support member 38 and movable member 39 are in the relative positions shown in FIGS. 5A and 5B. Electromagnetic solenoid 41 having a permanent magnet (not shown in the figures) is attached to support member 38, and includes a plunger 42 secured to lower member 39b of movable member 39 (FIG. 5B. These units make up the MICR open-close mechanism. As shown in FIGS. 4A and 4B, when presser roller 34 is separated from MICR head 33 (open state), support member 38 and movable member 39 are held in a first relative position by the permanent magnet (not shown in the figure). When electromagnetic solenoid 41 is driven to extend plunger 42, support member 38 and movable member 39 are held in a second relative position as shown FIGS. 5A and 5B. MICR head 33 and presser roller 34 are brought into contact (closed state) by the force of coil spring 40, as shown. The permanent magnet, solenoid 41 and coil spring 40 form a self-holding type of plunger unit which is well known in the art.

With the above-described configuration of reader unit 32, presser roller 34 is moved up and down in a direction perpendicular to the transport direction (direction of arrows F and B in FIG. 3) of check paper P. This permits the width of reader unit 32 in the transport direction of check paper P to be minimized, thus facilitating a compact configuration and reducing the distance between the presser member and feed rollers which requires a top or bottom margin of the MICR character printing.

The flowcharts in FIGS. 6 to 12 illustrate the control operation of the present invention.

Figure 6:
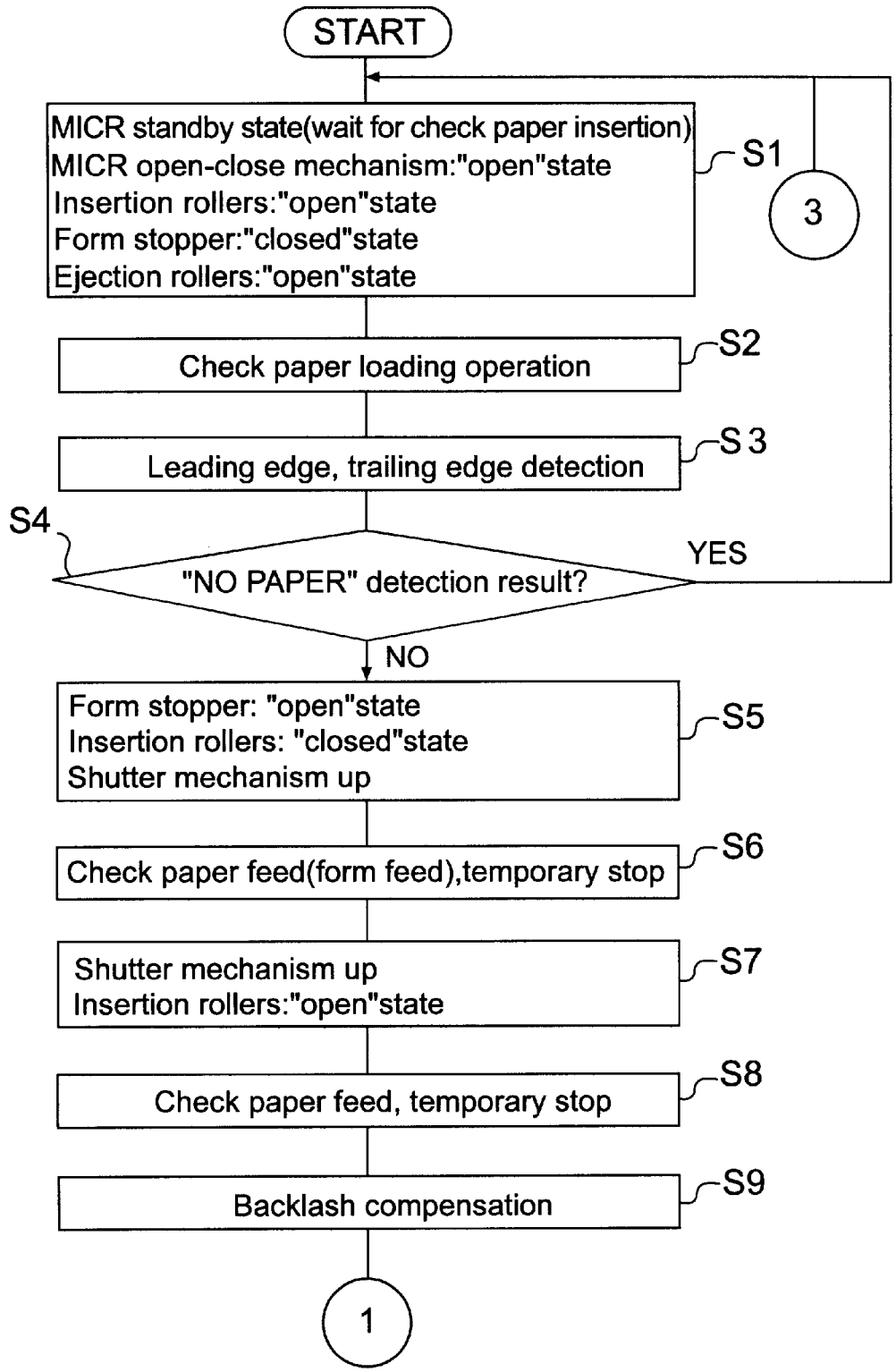
FIG. 6 is a first part of the flowchart showing the operation of the first embodiment of the control method of the composite processing device of the present invention.
Figure 7:
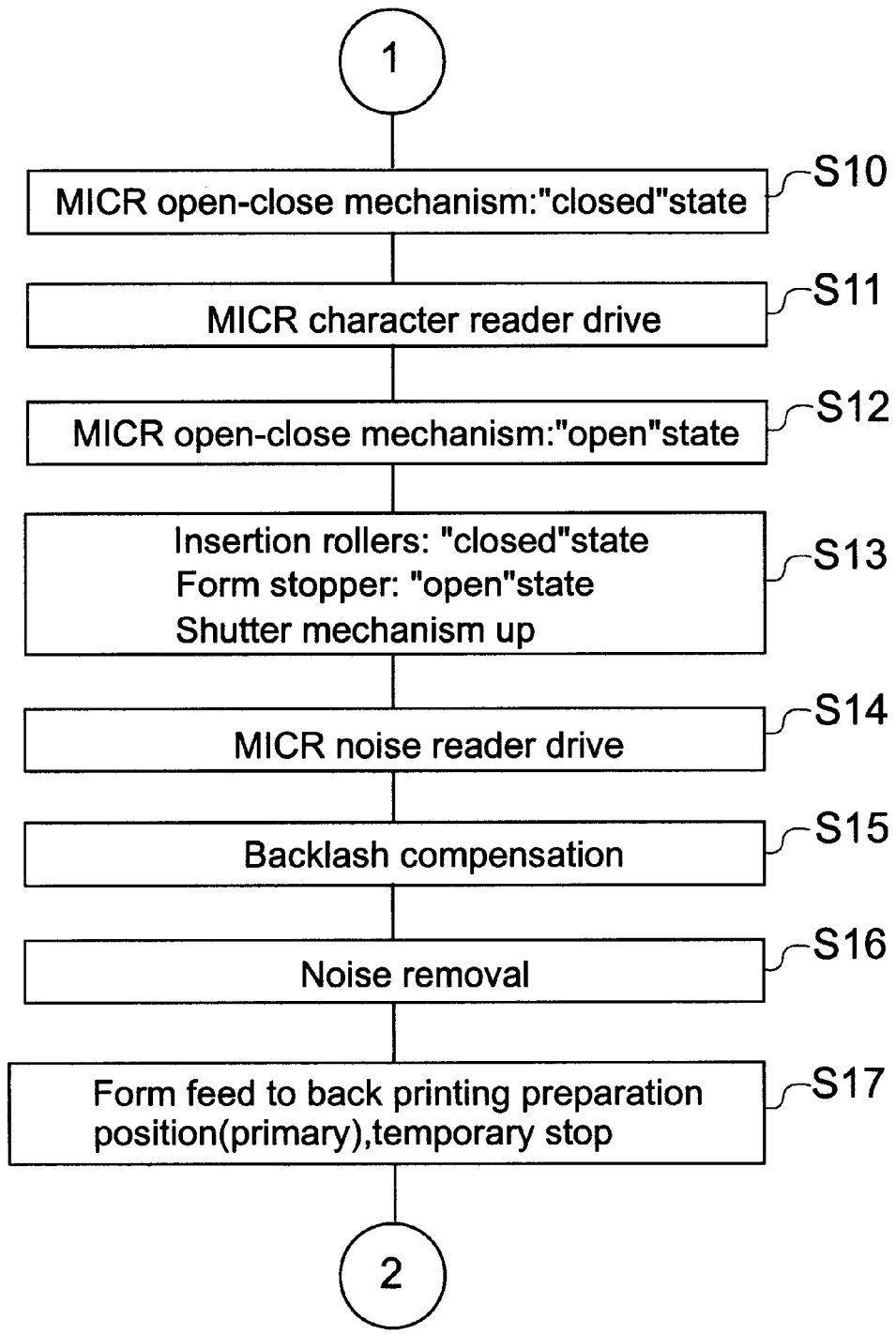
FIG. 7 is a second part of the flowchart showing the operation of the first embodiment.
Figure 8:
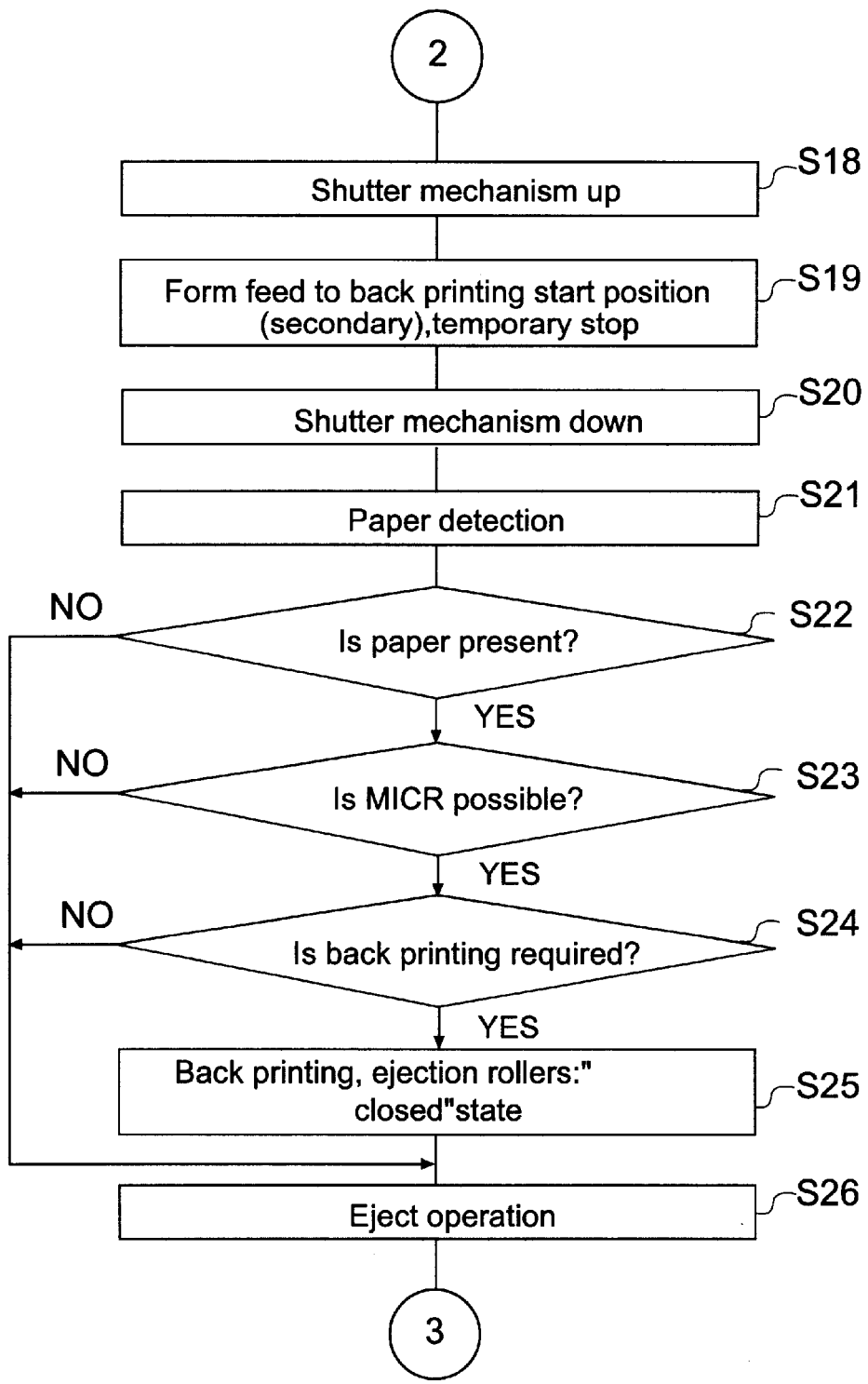
FIG. 8 is a third part of the flowchart showing the operation of the first embodiment.

FIGS. 6 to 8 show the control operation of a first embodiment of the present invention.

In step S1, MICR head 33 is initially in a standby state, waiting for insertion of check paper P. Presser roller 34 is shifted to the position shown in FIGS. 4A and 4B and insertion roller 24 and ejection roller 20 shift to the positions indicated by their corresponding dashed lines in FIG. 3. Thus, the MICR open-close mechanism, insertion rollers 23, 24 and ejection rollers 19, 20 are each in an open state. Form stopper 31, however, is shifted to the position indicated by the dashed line in FIG. 3 and goes to a closed state.

In step S2, the check paper P loading operation is performed, and in step S3 the respective detection results are obtained from trailing edge detector 29 and leading edge detector 30. In step S4, a judgment is performed as to whether or not there is a "no paper" detection result, i.e., whether or not there is a detection result output from one or both of trailing edge detector 29 and leading edge detector 30 indicating "no paper." If a "YES" is returned, then processing returns to step S1, but if a "NO" is returned, the processing proceeds to step S5. In step S4, if one or both of trailing edge detector 29 and leading edge detector 30 outputs a detection result indicating "no paper," then it indicates that check paper P has not been inserted properly.

In step S5, form stopper 31 is shifted to the position indicated by the solid line in FIG. 3 and goes to an open state, while insertion roller 24 goes to the position indicated by the solid line in FIG. 3 and goes to a closed state and shutter mechanism 37 is shifted approximately 4 mm (for example, the number of steps of a drive motor may be 75 steps) toward the position indicated by the dashed line in FIG. 3.

In step S6, form feeding of check paper P is performed. Insertion rollers 23, 24 are rotated in the forward direction which transports check paper P in the direction of arrow F (exit direction) in FIG. 3. After check paper P passes slip center rollers 21, 22 and reaches the position immediately before entering ejection rollers 19, 20, insertion roller 24 and slip center roller 22 stop rotating, thus temporarily stopping transport of check paper P.

In step S7, with shutter mechanism 37 shifted upward toward the position indicated by the dashed line in FIG. 3, insertion roller 24 is shifted to the position indicated by the dashed line, thus changing insertion rollers 23, 24 to an open state.

In step S8, slip center rollers 21, 22 are rotated and check paper P is transported in the direction of arrow F in FIG. 3. When the trailing edge of check paper P reaches a prescribed position immediately before slip center rollers 21, 22, the rotation of slip center rollers 21, 22 is stopped and transport of check paper P is temporarily stopped. Further, in step S9, the drive motor (not shown in the figure) reverses rotation slightly to compensate for backlash.

In step S10, MICR open-close mechanism is set to an closed state by shifting presser roller 34 to the position indicated in FIGS. 5(a)(b).

In step S11, slip center rollers 21, 22 are rotated in reverse which transports check paper P in the direction of arrow B (direction opposite the exit direction), while MICR head 33 is driven and reads the MICR characters recorded on check paper P.

In step S12, MICR open-close mechanism is set to an "open" state after reading is complete (leading edge of check paper passes MICR head 33) by shifting presser roller 34 to the position indicated in FIGS. 4(a)(b). Rotation of slip center rollers 21, 22 is stopped when the leading edge of check paper passes, which stops the transport of check paper P.

In step S13, insertion roller 24 is shifted to the position indicated by the solid line in FIG. 3 and goes to a closed state, while shutter mechanism 37 is shifted up approximately 4 mm with form stopper 31 remaining in an open state.

In step S14, check paper P is transported in the direction of arrow B while noise is being read by MICR head 33. After check paper P passes slip center rollers 21, 22, the insertion rollers 23, 24 transport check paper P a prescribed amount to the position where the leading edge passes from insertion rollers 23, 24.

In step S15, backlash compensation is performed by slightly driving the drive motor, which is not shown in the figure, and in step S16 the noise read in step S14 is removed.

In step S17, primary form feeding of check paper P is performed. That is, insertion rollers 23, 24 are rotated in the forward direction which transports check paper P in the direction of arrow F in the FIG. 3. Also, after check paper P has passed ejection rollers 19, 20, the rotation of insertion roller 24 and slip center roller 22 is stopped at the point where the leading edge reaches the back printing preparation position just before entering ejection rollers 19, 20 and the transport of check paper P is temporarily stopped.

Further, in step S18, shutter mechanism 37 is shifted up to the position indicated by the dashed line in FIG. 3 while in this state.

In step S19, secondary form feeding of check paper P is performed. That is, insertion rollers 23, 24 and slip center rollers 21, 22 are rotated in the forward direction which transports check paper P in the direction of arrow F in FIG. 3, and when the leading edge of check paper P reaches the point where it engages ejection rollers 19, 20, the rotation of insertion roller 24 and slip center roller 22 is stopped, which temporarily stops the transport of check paper P.

Also, in step S20, shutter mechanism 37 is shifted down to the position indicated by the solid line in FIG. 3 while in this state.

In step S21, the detection result from paper detector 36 is received, and it is judged whether or not check paper P is present in step S22, and if a "YES" is returned, processing continues to step S23, but if a "NO" is returned, processing moves to step S26.

In step S23, it is judged whether or not the contents of the MICR characters of check paper P read by MICR head 33 can be recognized, and if a "YES" is returned, processing proceeds to step S24, but if a "NO" is returned, processing moves to step S26.

In step S24, the contents of the MICR characters read are analyzed and it is judged whether or not back printing is required based on those contents, and if a "YES" is returned, then processing proceeds to step S25, but if a "NO" is returned the processing moves to step S26.

In step S25, ejection roller 19 is shifted to the position indicated by the solid line in FIG. 3 and goes to a closed state, and slip center rollers 21, 22 and ejection rollers 19, 20 are rotated in the forward direction which transports check paper P in the direction of arrow F, while print head 4a is driven and performs back printing on check paper P.

In step S26, check paper P is ejected from exit opening 18 by rotating slip center rollers 21, 22 and ejection rollers 19, 20 in the forward direction.

Figure 9:
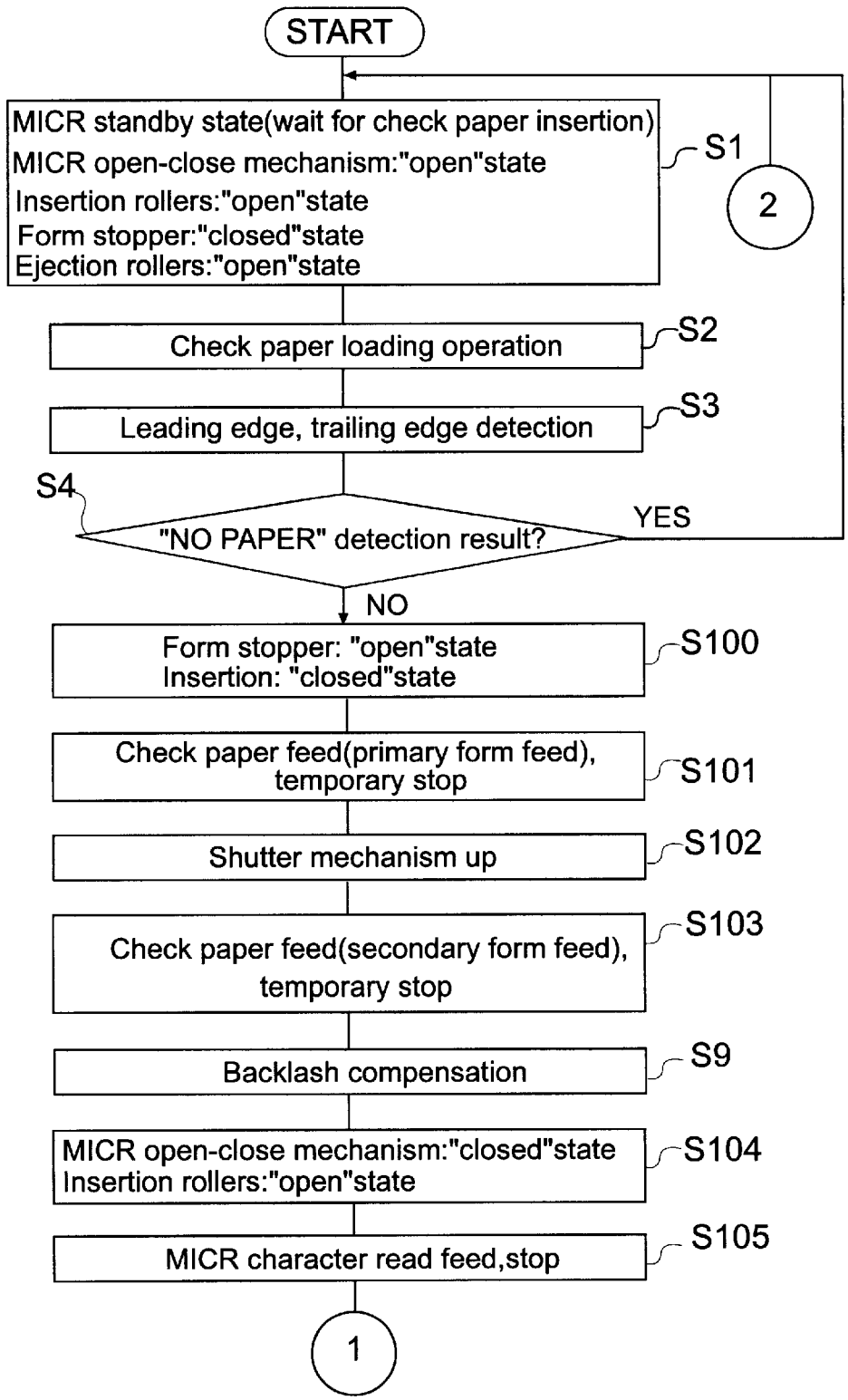
FIG. 9 is a first part of the flowchart showing the operation of the second embodiment of the control method of the composite processing device of the present invention.
Figure 10:
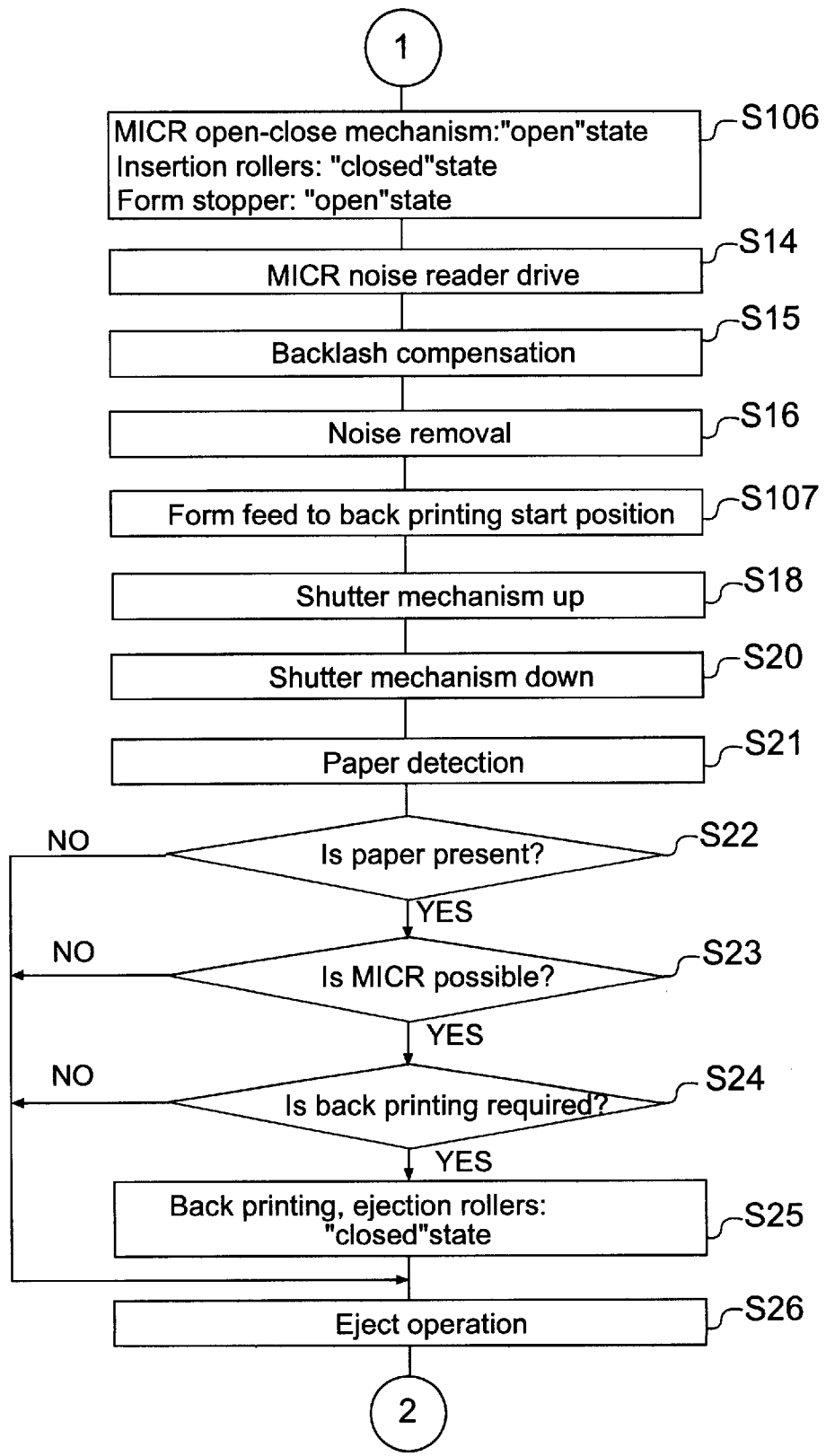
FIG. 10 is a second part of the flowchart showing the operation of the second embodiment.

FIG. 9 and FIG. 10 are flowcharts illustrating the control operation in an alternate embodiment of the invention. In FIG. 9 and FIG. 10, steps that perform the same operations as the steps in the flowcharts in FIG. 6 to FIG. 8 are given the same numbers and their explanation is omitted.

In FIG. 9 and FIG. 10, the steps that perform processing differently from that in the steps in the flowcharts in FIG. 6 to FIG. 8 are steps S100 to S107.

In step S100, form stopper 31 is shifted to the position indicated by the solid line in FIG. 3 and goes to an open state, while insertion roller 24 is shifted to the position indicated by the solid line in FIG. 3 and goes to a closed state, but shutter mechanism 37 is not shifted and remains in its current state (solid line in FIG. 3).

In step S101, primary form feeding of check paper P is performed. That is, insertion rollers 23, 24 are rotated in the forward direction which transports check paper P in the direction of arrow F in FIG. 3, and after check paper P passes slip center rollers 21, 22, the rotation of insertion roller 24 and slip center roller 22 is stopped when it reaches the position before entering ejection rollers 19, 20, which temporarily stops the transport of check paper P.

In step S102, shutter mechanism 37 is shifted up to the position indicated by the dashed line in FIG. 3. In this case, insertion rollers 23, 24 are left in a closed state.

In step S103, the secondary form feeding of check paper P is performed. That is, slip center rollers 21, 22 are rotated in the forward direction which transports check paper P in the direction of arrow F in FIG. 3, and when the trailing edge of check paper P reaches the prescribed position just before slip center rollers 21, 22, the rotation of slip center rollers 21, 22 is stopped, which temporarily stops the transport of check paper P.

In step S104, MICR open-close mechanism is set to a "closed" state by shifting presser roller 34 to the position shown in FIGS. 5(a)(b), while insertion roller 24 is shifted to the position indicated by the dashed line in FIG. 3, which sets insertion rollers 23, 24 to an open state.

In step S105, slip center rollers 21, 22 are rotated in the reverse direction which transports check paper P in the direction of arrow B while MICR head 33 is driven and reads the MICR characters recorded on check paper P. After completing reading, the rotation of slip center rollers 21, 22 is stopped at the position where the leading edge of check paper P reaches MICR head 33 and stops the transport of check paper P.

In step S106, the MICR open-close mechanism is set to an "open" state by presser roller 34 being shifted to the position shown in FIGS. 4(a)(b)., while insertion roller 24 is shifted to the position indicated by the solid line in FIG. 3, which sets sub-slip rollers 23, 24 to a closed state. In this case, form stopper 31 is held in an "open" state. Shutter mechanism 37 is not moved.

In step S107, check paper P is form fed to the starting position for back printing. That is, insertion rollers 23, 24 and slip center rollers 21, 22 are rotated in the forward direction which transports check paper P in the direction of arrow F in FIG. 3, and when the leading edge of check paper P reaches the position where it engages ejection rollers 19, 20, the rotation of insertion roller 24 and slip center roller 22 is stopped which temporarily stops the transport of check paper P.

Figure 11:
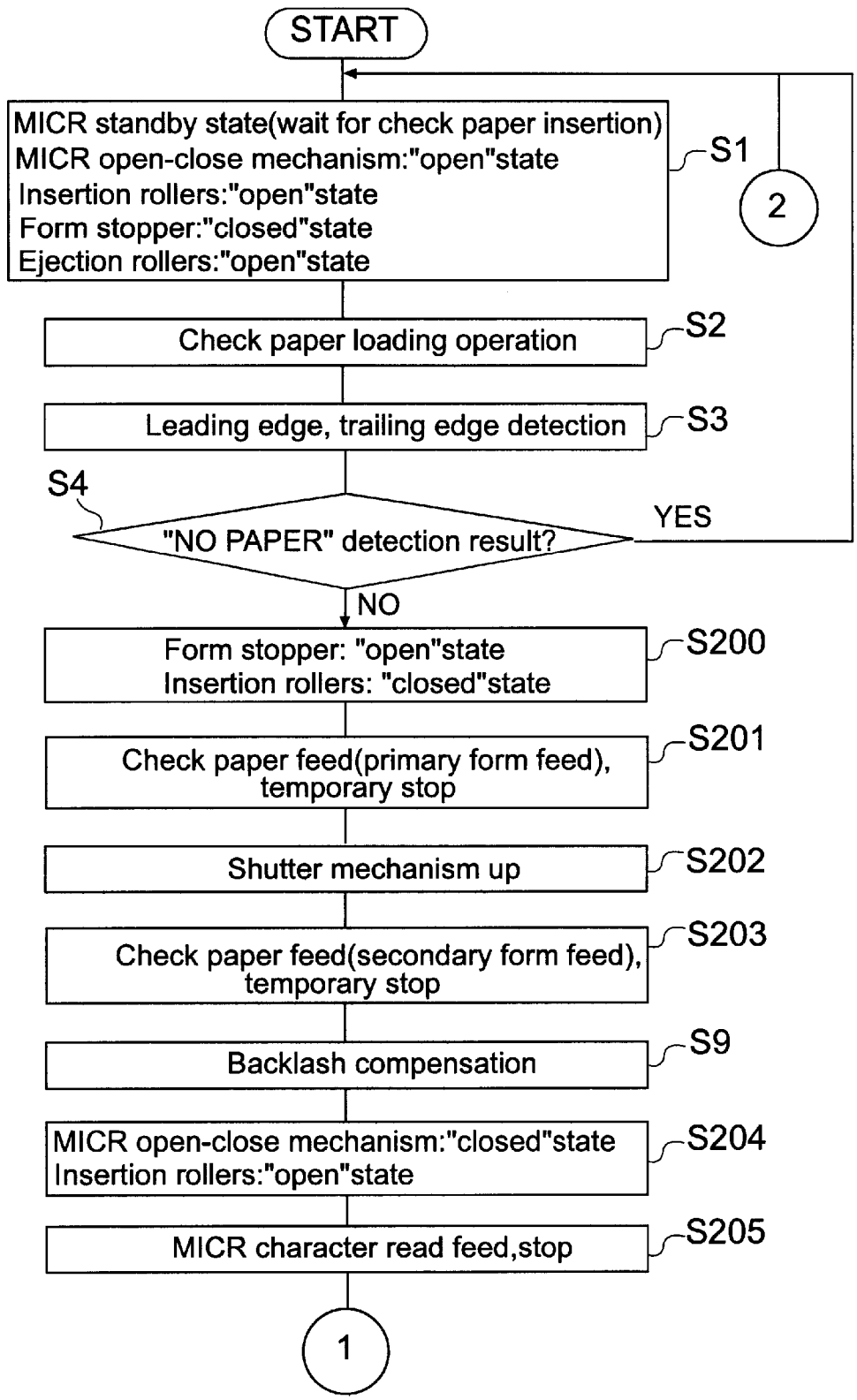
FIG. 11 is a first part of the flowchart showing the operation of the third embodiment of the control method of the composite processing device of the present invention.
Figure 12:
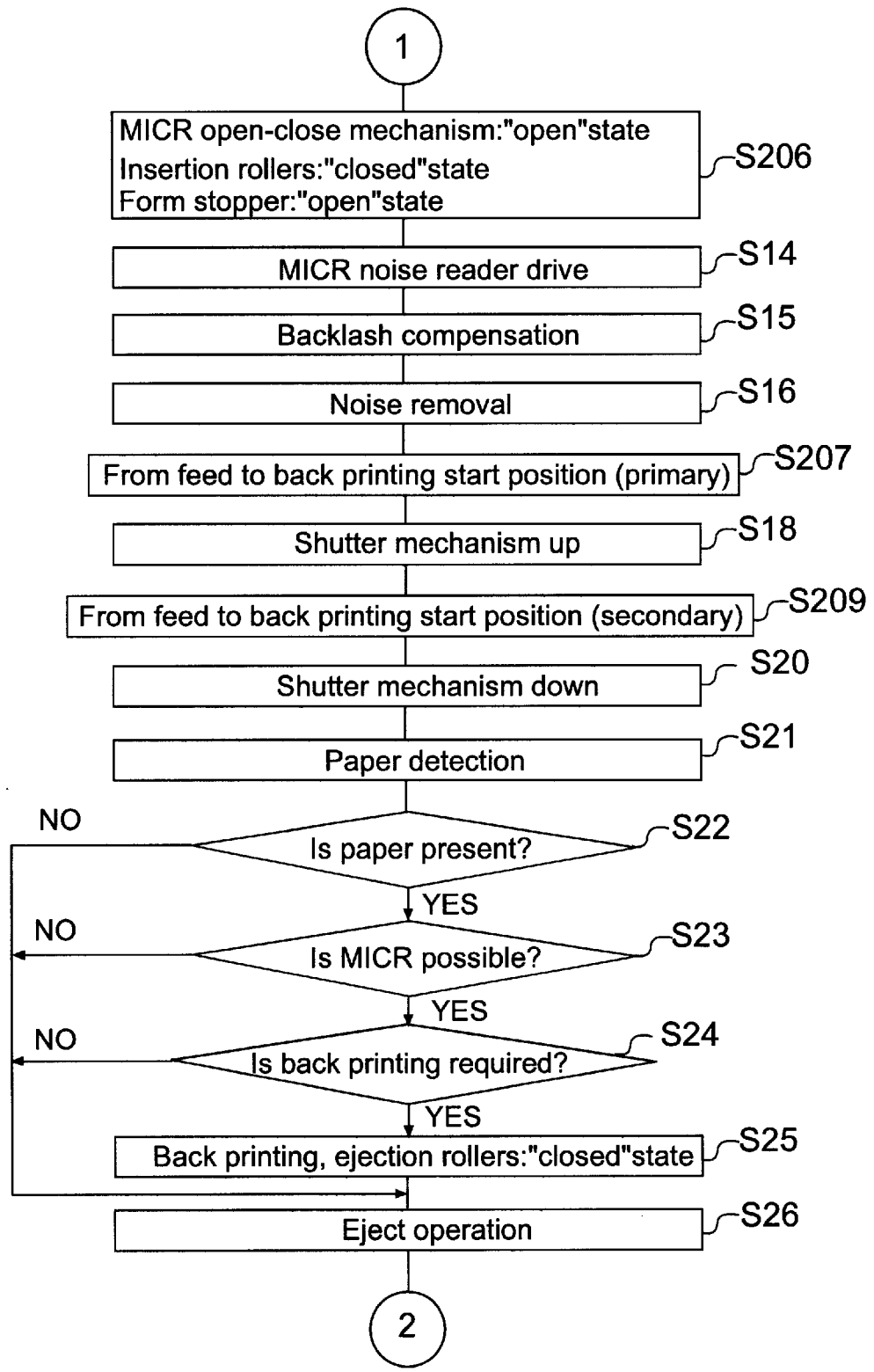
FIG. 12 is a second part of the flowchart showing the operation of the third embodiment.
Figure 13:
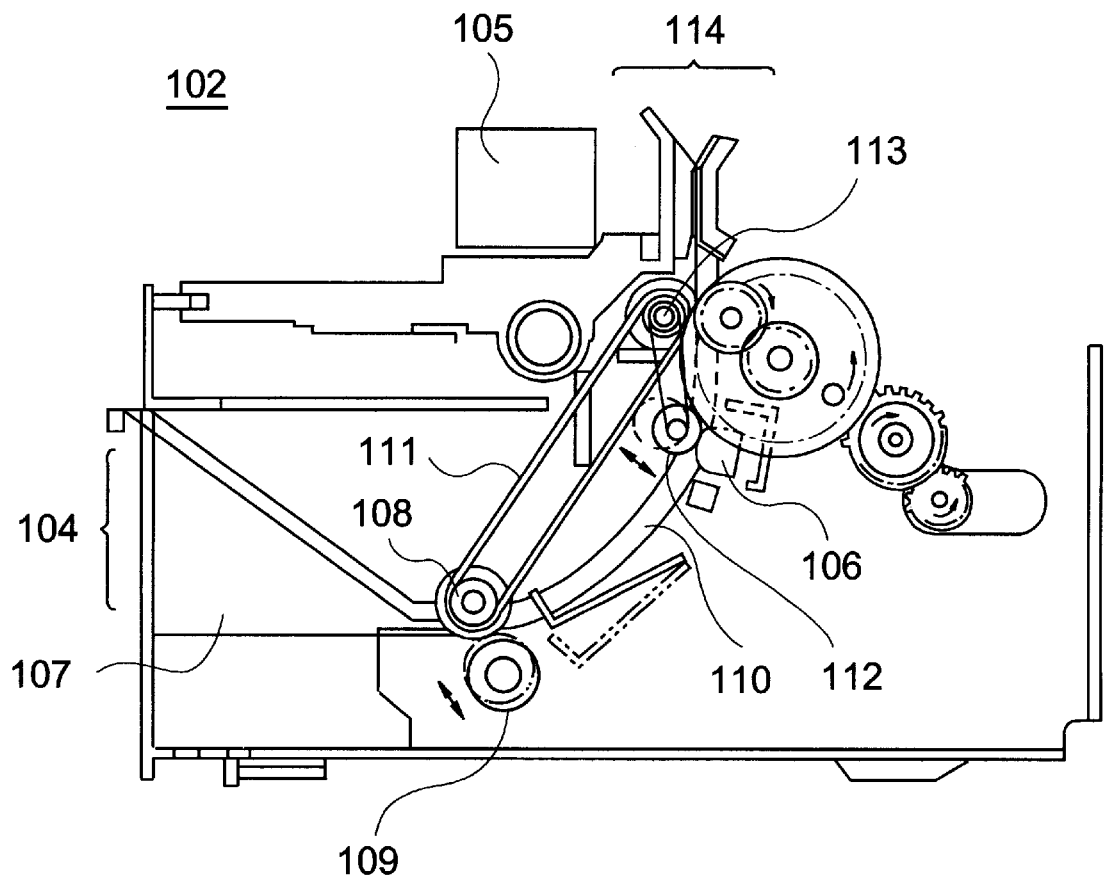
FIG. 13 is a schematic cross sectional view showing the principal components of an earlier developed composite processing device.

FIG. 11 and FIG. 12 are flowcharts showing another alternate embodiment of the control operation of the present invention. In FIG. 11 and FIG. 12, steps that perform the same operations as the steps in the flowcharts in FIG. 6 to FIG. 8 in the first embodiment above are given the same numbers and their explanation is omitted.

In FIG. 11 and FIG. 12, the steps that perform processing differently from that in the steps in the flowcharts in FIG. 6 to FIG. 8 are steps S200 to S208.

In step S200, form stopper 31 is shifted to the position indicated by the solid line in FIG. 3 and goes to an open state, while insertion roller 24 is shifted to the position indicated by the solid line in FIG. 3 and goes to a closed state, but shutter mechanism 37 is not shifted and remains in its current state (solid line in FIG. 3).

In step S201, primary form feeding of check paper P is performed. That is, insertion rollers 23, 24 are rotated in the forward direction which transports check paper P in the direction of arrow F in FIG. 3, and after check paper P passes slip center rollers 21, 22 and reaches the position where it enters ejection rollers 19, 20, the rotation of insertion roller 24 and slip center roller 22 is stopped which temporarily stops the transport of check paper P.

In step S202, shutter mechanism 37 is shifted up to the position indicated by the dashed line in FIG. 3. In this case, insertion rollers 23, 24 are left in a closed state.

In step S203, secondary form feeding of check paper P is performed. That is, slip center rollers 21, 22 are rotated in the forward direction which transports check paper P in the direction of arrow F in FIG. 3, and when the trailing edge of check paper P reaches a prescribed position before slip center rollers 21, 22, the rotation of slip center rollers 21, 22 is stopped which temporarily stops the transport of check paper P.

In step S204, presser roller 34 is shifted to the position shown in FIGS. 5(a) (b), whereby the MICR open-close mechanism is set to a "closed" state, while insertion roller 24 is shifted to the position indicated by the dashed line in FIG. 3, whereby insertion rollers 23, 24 are set to an open state.

In step S205, slip center rollers 21, 22 are rotated in the reverse direction which transports check paper P in the direction of arrow B, while MICR head 33 is driven and reads the MICR characters recorded on check paper P. Also, after completing reading, the rotation of slip center rollers 21, 22 is stopped when the leading edge of check paper P is at a position where it reaches MICR head 33, thus stopping the transport of check paper P.

In step S206, the MICR open-close mechanism is set to an "open" state by shifting presser roller 34 to the position shown in FIGS. 4(a)(b), while insertion rollers 23, 24 are set to a closed state by shifting insertion roller 24 to the position indicated by the solid line in FIG. 3. In this case, form stopper 31 is maintained in an "open" state. Shutter mechanism 37 is not moved at this time.

In step S207, primary form feeding of check paper P to the starting position of back printing is performed. That is, check paper P is transported in the direction of arrow F in FIG. 3 by rotating insertion rollers 23, 24 in the forward direction, and after check paper P passes slip center rollers 21, 22, the rotation of insertion roller 24 and slip center roller 22 is stopped when it reaches the position of entry into ejection rollers 19, 20, thus stopping the transport of check paper P.

In step S208, secondary form feeding of check paper P to the starting position of back printing is performed. That is, check paper P is transported in the direction of arrow F in FIG. 3 by rotating insertion rollers 23, 24 and slip center rollers 21, 22 in the forward direction, and when the leading edge of check paper P reaches the point where it engages ejection rollers 19, 20, the rotation of insertion roller 24 and slip center roller 22 is stopped, whereby the transport of check paper P is temporarily stopped.

As described above, check paper P is transported in the exit direction and in the reverse direction when the MICR characters recorded on check paper P are detected by MICR head 33, and therefore it is possible to detect the MICR characters from the trailing edge, which eliminates the need to perform inverted processing of the detection signal and makes it possible to perform highly accurate reading.

Also, since check paper P, pressed against MICR head 33 by presser roller 34, is pulled by slip center rollers 21, 22 disposed next to the upstream side of check paper P in the transport direction, and information is detected from paper with wrinkles, etc., is straightened by the tension generated in check paper P, check paper P need not be pressed with a high pressing force as in prior art devices and only a small force is required. Therefore, it is not necessary to consider the durability of MICR head 33, etc., thus making it possible to make the device more compact.

Also, since check paper P is transported toward exit opening 18 along the transport path, the device can easily be configured with separate insertion and transport members, thus accommodating a wide range of applications.

In accordance with the invention, check paper P is transported by two transport units (by slip center rollers 21, 22 and insertion rollers 23, 24, or by slip center rollers 21, 22 and ejection rollers 19, 20) at a time other than when the MICR characters are being read, and therefore check paper P can be reliably transported.

Particularly in the embodiment described above, presser roller 34 is pressed against MICR head 33 using movable member 39 which is capable of moving in a direction perpendicular to the transport path as shown in FIGS. 4A, 4B 5A, and 5B, thus making reader unit 32 smaller, and as a result it is possible to configure a shorter transport path and to always transport check paper P reliably using two transport units.

Further, in accordance with the present invention, when check paper P is guided by ejection rollers 19, 20, it is guided by shifting shutter mechanism 37 to the printing position, whereby even a check paper P with wrinkles, etc., can be reliably guided to ejection rollers 19, 20 and ejected from exit opening 18 without a paper jam.

This invention is not limited to the above embodiment and allows for various changes to be made.

For example, the above embodiment explained a case wherein the slip paper processed was a personal check, but this embodiment is not limited to this application and is applicable to various devices if they are a composite processing device that reads information recorded on a recording medium and performs print processing on the recording medium based on that information.

The printing unit for printing on the recording medium is not limited to an ink jet system. For example, a dot impact printer may also be used.

As described above, in accordance with the present invention, a recording medium can be effectively brought in contact with an information detector without pressing the recording medium against the information detector with excessive pressure as in prior art devices, thus making it possible to make the device compact and lower its cost.

Further, the insertion member and exit member for the recording medium can be configured separately, thus allowing a wide range of applications.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

Explanation of Numbers in Drawings 1 printer (composite processing device)
4 printer member
4a print head
19, 20 ejection rollers (exit transporter)
21, 22 slip center rollers (main transporter)
23, 24 insertion rollers (insertion transporter)
29 trailing edge detector
30 leading edge detector
31 form stopper
32 reader unit
33 MICR head (information detector)
34 presser roller (presser)
35 platen
36 paper detector
37 shutter mechanism (guide mechanism)

39 movable member (presser shifter)
100 transport mechanism
P check paper (recording medium)

What is claimed is:

1. An information detection apparatus comprising:
an inlet;
an information detector that detects information recorded on a recording medium by coming in contact with the recording medium at a contacting area;
a presser that presses the recording medium against said information detector;
a presser shifter that supports said presser and selectively moves said presser
to a first position where said presser presses the recording medium against said information detector, and
to a second position where said presser is apart from said information detector so as to release the recording medium;
a transport path that guides the recording medium to at least said information detector;
a first medium transporter, disposed in a position shifted by a predetermined distance in a first direction from the contacting area, said first medium transporter transporting the recording medium in at least the first direction along said transport path; and
a second medium transporter, disposed near said inlet, said second medium transporter holding and then transporting the recording medium to said first medium transporter; and
wherein said information detector detects the information recorded on the recording medium while said presser is in the said first position, while said first medium transporter transports the recording medium in the first direction and after said second medium transporter releases the recording medium.

2. The information detection apparatus according to claim 1, wherein
said first medium transporter comprises a first pair of rollers; and
said second medium transporter comprises:
a second pair of rollers; and
an open/close mechanism for closing said second pair of rollers to hold the recording medium with said second pair of rollers and for opening said second pair of rollers to release the recording medium.

3. The information detection apparatus according to claim 1, wherein said predetermined distance is determined in accordance with a relative position of said information recorded on the recording medium from an edge of the recording medium.

4. The information detection apparatus according to claim 1, further comprising:
an exit; and
a third medium transporter, disposed near said exit, said third medium transporter having a holding position and a releasing position, wherein when said third medium transporter is in the holding position holding the recording medium, said third medium transporter then transports the recording medium from the first medium transporter, and wherein while said third medium transporter is in the releasing position releasing the recording medium, said information detector detects the information recorded on the recording medium.

5. The information detection apparatus according to claim 4, wherein
said third medium transporter comprises:
a pair of rollers; and
an open/close mechanism for closing said pair of rollers to hold the recording medium with said pair of rollers and for opening said pair of rollers to release the recording medium.

6. A composite processing apparatus according to claim 4, wherein
said third medium transporter comprises:
a pair of rollers; and
an open/close mechanism for closing said pair of rollers to hold the recording medium with said pair of rollers and for opening said pair of rollers to release the recording medium.

7. A composite processing apparatus comprising:
an inlet;
an information detector that detects information recorded on a recording medium while in contact with the recording medium at a contacting area;
a presser that presses the recording medium against said information detector;
a presser shifter that supports said presser and to selectively moves said presser
to a first position where said presser presses the recording medium against said information detector and
to a second position where said presser is apart from said information detector so as to release the recording medium;
a transport path that guides the recording medium to at least said information detector;
a first medium transporter, disposed in a position shifted by a predetermined distance in a first direction from the contacting area, said first medium transporter transporting the recording medium in at least the first direction along said transport path;
a second medium transporter, disposed near said inlet, said second medium transporter holding and then transporting the recording medium to said first medium transporter; and
a print head for printing on the recording medium,
wherein said information detector detects said information recorded on the recording medium while the presser is in the first position while, said first medium transporter transports the recording medium in the first direction and after said second medium transporter releases the recording medium, and
wherein said print head prints on the recording medium while said presser shifter moves said presser to the second position.

8. The composite processing apparatus according to claim 7,
wherein said print head is disposed upstream of said first medium transporter in the first direction,
wherein said first medium transporter transports the recording medium in a second direction opposite the first direction, and
wherein said print head prints on the recording medium while said first medium transporter transports the recording medium in the second direction.

9. The composite processing apparatus according to claim 7,
wherein said first medium transporter comprises a first pair of rollers,
said second medium transporter comprises:

a second pair of rollers; and an open/close mechanism for closing said second pair of rollers to hold the recording medium with said second pair of rollers and for opening said second pair of rollers to release the recording medium.

10. The composite processing apparatus according to claim 7, wherein said predetermined distance is determined in accordance with a relative position of the information recorded on the recording medium from an edge of the recording medium.

11. The composite processing apparatus according to claim 7, further comprising:

an exit; and a third medium transporter, disposed near said exit, said third medium transporter having a holding position and a releasing position, wherein when said third medium transporter is in the holding position holding the recording medium, said third medium transporter then transports the recording medium from said first medium transporter, and wherein while said third medium transporter is in the releasing position releasing the recording medium, said information detector detects the information recorded on the recording medium.

12. A method of detecting information recorded on a recording medium comprising the steps of:

(a) transporting the recording medium to an information detector by a first medium transporter disposed at an inlet;

(b) pressing the recording medium against the information detector to contact the recording medium to the information detector;

(c) releasing the recording medium by the first medium transporter;

(d) transporting the recording medium in a first direction, by a second medium transporter disposed in a position shifted from the contacting portion of the information detector with the recording medium by a predetermined distance in the first direction; and (e) detecting the information recorded on the recording medium by the information detector while pressing the recording medium in step (b), while the second medium transporter transports the recording medium in the first direction and after the first medium transporter releases the recording medium.

13. The method of detecting information according to claim 12, wherein the predetermined distance is determined in accordance with a relative position of the information recorded on the recording medium from an edge of the recording medium.

14. The method of detecting information according to claim 12, further comprising the step of (f) transporting the recording medium, by a third medium transporter disposed at a exit, from the information detector after step (e), wherein in step (e) the recording medium is released from the third transporter.

15. A method of processing a recording medium comprising the steps of:

(a) transporting the recording medium to an information detector by a first medium transporter disposed at an inlet;

(b) pressing the recording medium against the information detector to contact the recording medium to the information detector;

(c) releasing said recording medium by the first medium transporter;

(d) transporting said recording medium in a first direction, by a second medium transporter disposed in a position shifted from the contacting portion of the information detector with the recording medium by a predetermined distance in the first direction;

(e) detecting the information recorded on the recording medium by the information detector while pressing the recording medium in step(b), while the second medium transporter transports the recording medium in the first direction and after the first medium transporter releases the recording medium;

(f) releasing said recording medium after the pressing step; and (g) printing on the recording medium after releasing the recording medium in step(f).

16. The method of processing a recording medium according to claim 15, further comprising the step of:

(h) transporting said recording medium by the second medium transporter in a second direction opposite the first direction, and wherein in step (g) printing is performed while the second medium transporter transports the recording medium in a second direction opposite to the first direction.

17. The method of processing a recording medium according to claim 15, wherein the predetermined distance is determined in accordance with a relative position of the information recorded on the recording medium from an edge of the recording medium.

18. The method of processing a recording medium according to claim 15, further comprising the step of (i) transporting the recording medium, by a third medium transporter disposed on a exit, from the information detector after step (e), wherein in step (e) the recording medium is released from the third transporter.

* * * * *